United States Patent
Luo

(10) Patent No.: US 11,261,939 B2
(45) Date of Patent: Mar. 1, 2022

(54) CHANGEABLE LINEAR SPEED REDUCTION CLUTCH

(71) Applicant: Can Luo, Kunming (CN)

(72) Inventor: Can Luo, Kunming (CN)

( * ) Notice: Subject to any disclaimer, the term of this patent is extended or adjusted under 35 U.S.C. 154(b) by 0 days.

(21) Appl. No.: 17/051,145

(22) PCT Filed: May 24, 2019

(86) PCT No.: PCT/CN2019/088341
§ 371 (c)(1),
(2) Date: Oct. 27, 2020

(87) PCT Pub. No.: WO2019/228265
PCT Pub. Date: Dec. 5, 2019

(65) Prior Publication Data
US 2021/0054909 A1    Feb. 25, 2021

(30) Foreign Application Priority Data
Jun. 2, 2018 (CN) .......................... 201810560020.2

(51) Int. Cl.
*F16H 1/28* (2006.01)
*B64C 27/12* (2006.01)
(Continued)

(52) U.S. Cl.
CPC ............... *F16H 1/28* (2013.01); *B64C 27/12* (2013.01); *B64C 27/82* (2013.01); *F16H 57/10* (2013.01); *F16H 2001/2881* (2013.01)

(58) Field of Classification Search
CPC .................................. F16H 1/28; F16H 57/10
See application file for complete search history.

(56) References Cited

U.S. PATENT DOCUMENTS

| | | | |
|---|---|---|---|
| 2011/0183801 A1* | 7/2011 | Ando | B60K 6/445 475/5 |
| 2015/0018152 A1* | 1/2015 | Kato | B60W 10/02 475/5 |
| 2017/0106851 A1* | 4/2017 | Iwase | B60K 6/365 |

FOREIGN PATENT DOCUMENTS

| | | |
|---|---|---|
| CN | 2206381 Y | 8/1995 |
| CN | 102966708 A | 3/2013 |

(Continued)

OTHER PUBLICATIONS

International Search Report (in Chinese and in English) and Written Opinion issued in PCT/CN2019/088341, dated Jul. 25, 2019, 9 pages provided.

*Primary Examiner* — Derek D Knight
(74) *Attorney, Agent, or Firm* — Hamre, Schumann, Mueller & Larson, P.C.

(57) ABSTRACT

The present invention provides a changeable linear speed reduction clutch, which is formed by connecting a changeable linear speed double-layer planetary gear train and a brake, and is transmission machinery with functions of both a speed reducer and a clutch. A planetary carrier of the changeable linear speed double-layer planetary gear train is used as an input end, one central gear as an output end, the other central gear as a braking end, and the braking end is directly connected to the brake; and the changeable linear speed double-layer planetary gear train adopts one of two types of planetary gear trains. The brake at least has two states, that is, braking and non-braking states, wherein the braking state of the brake is equivalent to an engaged state of the clutch, and the non-braking state of the brake is equivalent to a disengaged state of the clutch. The method of setting the changeable linear speed double-layer planetary gear train, and the application method of the present invention are provided herein. Compared with a device in which (Continued)

a multi-stage speed reducer and a clutch are arranged independently, the changeable linear speed reduction clutch in the present invention is small and light and has a simple structure.

5 Claims, 1 Drawing Sheet

(51) Int. Cl.
*B64C 27/82* (2006.01)
*F16H 57/10* (2006.01)

(56) References Cited

FOREIGN PATENT DOCUMENTS

| CN | 205401619 U | 7/2016 |
|----|-------------|--------|
| CN | 107366717 A | 11/2017 |
| JP | H08184352 A | 7/1996 |

\* cited by examiner

CHANGEABLE LINEAR SPEED REDUCTION CLUTCH

TECHNICAL FIELD

The present invention relates to transmission machinery with a structure of a planetary gear train, in particular to transmission machinery which is formed by connecting a changeable linear speed double-layer planetary gear train and a brake and has the functions of both a speed reducer and a clutch.

BACKGROUND

Background knowledge of a planetary gear train: the planetary gear train consists of three components, that is, two central gears and a planetary carrier with planetary gears. An arrangement and meshing structural relationship of the three components determines a motion characteristic equation of the planetary gear train and determines the type of the planetary gear train. The existing planetary gear trains are divided into cylindrical gear planetary gear trains and bevel gear planetary gear trains. The cylindrical gear planetary gear train includes a sun gear, an inner gear ring and a planetary carrier with planetary gears, wherein the sun gear, the inner gear ring and the planetary gears are all cylindrical gears. The cylindrical gear planetary gear trains are divided into single-layer planetary gear trains or double-layer planetary gear trains according to the number of layers, that is, one layer or two layers, of the planetary gears. In the single-layer planetary gear train, the sun gear is meshed with the planetary gears, and the planetary gears are meshed with the inner gear ring. In the double-layer planetary gear train, the sun gear is meshed with the inner layer of the planetary gears, which is meshed with the outer layer of planetary gears, and the outer layer of planetary gears is meshed with the inner gear ring. The bevel gear planetary gear train includes two central gears and a planetary carrier with planetary gears, and it is generally a single-layer planetary gear train in which one layer of planetary gears exists. And the two central gears and planetary gears thereof are bevel gears; the left central gear is meshed with the planetary gears, and the planetary gears are meshed with the right central gear. Both the sun gear and the inner gear ring belong to the central gear. The sun gear is the left central gear, which is a central gear with a small pitch circle diameter, and the inner gear ring is the right central gear, which is a central gear with a large pitch circle diameter. The present invention provides that all transmission machinery consisting of two central gears and the planetary carrier with planetary gears is planetary gear trains, one central gear is meshed with the planetary gears, multiple layers of planetary gears are meshed with each other or are directly connected, and the planetary gears are meshed with the other central gear. The planetary carrier takes the planetary gears to rotate around axes of the central gears. The planetary gears perform both revolving and rotating, and the number of layers of the planetary gears may be one, two, or three. For example, the double-sun-gear planetary gear train is a kind of double-layer planetary gear train, which includes two central gears (sun gears) and a planetary carrier with planetary gears, wherein two central gears and the planetary gears thereof are all cylindrical gears, and each of the planetary gears is two coaxial gears, called the left planetary gear and the right planetary gear. The left planetary gear is meshed with the left central gear, the left planetary gear is directly connected to the right planetary gear, and the right planetary gear is meshed with the right central gear. A pitch circle diameter of the left central gear is not equal to a pitch circle diameter of the right central gear, and a gear module of the left central gear is unnecessarily equal to a gear module of the right central gear. For another example, the double-inner-gear-ring planetary gear train is a kind of double-layer planetary gear train, which includes two central gears (inner gear rings) and a planetary carrier with planetary gears, wherein two central gears and the planetary gears thereof are all cylindrical gears, and each planetary gear is two coaxial gears, called the left planetary gear and the right planetary gear. The left planetary gear is meshed with the left central gear, the left planetary gear is directly connected to the right planetary gear, and the right planetary gear is meshed with the right central gear. The pitch circle diameter of the left central gear is not equal to the pitch circle diameter of the right central gear, and the gear module of the left central gear is unnecessarily equal to the gear module of the right central gear. For the three components of the planetary gear train, let the left central gear be z, the planetary carrier be j, the right central gear be y, the left planetary gear be xz, and the right planetary gear be xy; let $Z_z$ be the number of teeth of the left central gear, $Z_y$ be the number of teeth of the right central gear, $Z_{xz}$ be the number of teeth of the left planetary gear, $Z_{xy}$ be the number of teeth of the right planetary gear, $N_z$ be a revolving speed of the left central gear, $N_y$ be a revolving speed of the right central gear, and $N_j$ be the revolving speed of the planetary carrier; let the characteristic parameter of the double-sun-gear planetary gear train or the characteristic parameter of the double-inner-gear-ring planetary gear train hold $a=(Z_y*Z_{xz})/(Z_z*Z_{xy})$. The motion characteristic equation of all single-layer planetary gear trains is $N_z-a*N_y=(1-a)*N_j$. The planetary gear train that obeys the motion characteristic equation is a single-layer planetary gear train. When the planetary carrier of the single-layer planetary gear train is braking, the two central gears revolves in reversed directions. The motion characteristic equation of all double-layer planetary gear trains is $N_z-a*N_y=(1-a)*N_j$. The planetary gear train that obeys the motion characteristic equation is a double-layer planetary gear train. When the planetary carrier of the double-layer planetary gear train is braking, the two central gears revolves in the same direction. Due to that the left and right planetary gears in the double-sun-gear planetary gear train and the double-inner-gear-ring planetary gear train are directly connected, that the two planetary gears are one-to-one coaxial, and that the two planetary gears have the same revolving speed but have different pitch circle diameters, they have different pitch circle linear speeds; therefore, both the double-sun-gear planetary gear train and the double-inner-gear-ring planetary gear train are changeable linear speed double-layer planetary gear trains.

The transmission system of the existing fuel-powered helicopter must be arranged with a speed reducer and a clutch. The transmission ratios of the speed reducers of the top rotors of different helicopters range from 70 to 140. The speed reducer adopted is a multi-stage speed reducer which is large and heavy and has a complex structure. Generally, the clutch adopted is a hydraulic multi-plate friction clutch which can transmit power when the clutch is engaged; the clutch does not transmit powder when it is disengaged, which drives the top rotor to rotate freely to implement an emergency landing. These two devices are arranged independently, so the transmission system of the helicopter is large and heavy and has a complex structure.

The present invention provides a changeable linear speed reduction clutch formed by connecting a changeable linear speed double-layer planetary gear train and a brake. The changeable linear speed reduction clutch has the functions of both a speed reducer and a clutch, which is small and light and has a simple structure, and it is used to improve the transmission system of the helicopter.

SUMMARY

The changeable linear speed reduction clutch in the present invention is formed by connecting a changeable linear speed double-layer planetary gear train and a brake. The front part is connected to a power source, and the rear part is connected to a power using device.

Each changeable linear speed double-layer planetary gear train has three components, that is, two central gears and a planetary carrier with planetary gears. The changeable linear speed double-layer planetary gear train in the present invention is characterized in that the pitch circle diameters of the two central gears are very close but not equal. In the present invention, the planetary carrier of the changeable linear speed double-layer planetary gear train is used as an input end, one central gear as an output end, and the other central gear as a braking end; the input end is also an input end of the present invention, the output end is also an output end of the present invention, and the braking end is directly connected to the brake. The changeable linear speed double-layer planetary gear train is one of the two types of planetary gear trains, and the number of the planetary gear sets in the planetary gear train ranges from one to six. The first type is a double-sun-gear planetary gear train. When the double-sun-gear planetary gear train is adopted, the planetary carrier (1) of the planetary gear train is used as the input end (4), the left central gear (2) as the output end (5), and the right central gear (3) as the braking end, and the braking end is directly connected to the brake (6), as shown in FIG. 1. The second type is a double-inner-gear-ring planetary gear train. When the double-inner-gear-ring planetary gear train is adopted, the planetary carrier (1) of the planetary gear train is used as the input end (4), the left central gear (2) as the output end (5), and the right central gear (3) as the braking end, and the braking end is directly connected to the brake (6), as shown in FIG. 2.

As a mature technology, the brake which includes a booster brake, an electrically controlled brake and the like at least has two states, that is, braking and non-braking states, and can be controlled by a control system to be in one of the two states. In the accompany drawings of the description of the present invention, the brake is shown as a symbol of a clutch with one end being grounded.

The input end of the changeable linear speed reduction clutch of the present invention is connected to the power source, the output end is connected to the power using device, and the brake is controlled by the control system.

In the present invention, the changeable linear speed double-layer planetary gear train is set as follows: a characteristic parameter a of the planetary gear train is set to be close to but not equal to 1.0, i.e., the pitch circle diameters of the two central gears are very close but not equal. Specifically, a is from 0.8 to 1.25 and not equal to 1.0. The value a depends on a speed reduction transmission ratio required. That is, set a=number of teeth of a right central gear*number of teeth of a left planetary gear/(number of teeth of a left central gear*number of teeth of a right planetary gear), so that a is from 0.8 to 1.25 and not equal to 1.0. Because the number of gear teeth is a non-zero natural number, the value range of a is non-continuous. For the combination of the number of teeth of the right central gear, the number of teeth of the left central gear, the number of teeth of the right planetary gear and the number of teeth of the left planetary gear, refer to Embodiments 1 and 2. Each combination of the number of teeth of the right central gear, the number of teeth of the left central gear, the number of teeth of the right planetary gear and the number of teeth of the left planetary gear corresponds to a value a, and the closer the value a is to 1.0, the greater the speed reduction transmission ratio will be. Speed reduction transmission ratio=$1/(1-a)$, and the value range of the speed reduction transmission ratio is also non-continuous; when the transmission ratio is positive, the revolving directions of the input and output ends are the same; when the transmission ratio is negative, the revolving directions of the input and output ends are opposite. In the present invention, the method for setting the planetary gear train uses a digital expression of characteristic parameters of the planetary gear train. Essentially, the characteristic parameters of the planetary gear train are expression of number of teeth and structure arrangement of each component of the planetary gear train. It can be understood by those skilled in the art that setting of the characteristic parameters of the planetary gear train corresponds to the setting of the number of gears and structure of the planetary gear, and finally to the setting of the structure of the changeable linear speed reduction clutch.

Application method of the present invention: when the brake is controlled in the braking state, the power speed is input from the input end and transmitted in a deceleration manner to the output end for outputting according to the aforementioned speed reduction transmission ratio, the input end being a driving end, and the output end being a driven end; the input and output ends are equivalent to an engaged state of the clutch. When the brake is controlled in the non-braking state, the braking end is free, the power speed is input from the input end, and the driven revolving speed of the power using device such as a rotor of a helicopter is input in reverse from the output end, the input and output ends being the driving ends and the braking end being the driven end; the power speed cannot be transmitted in a deceleration manner to the output end for outputting and the output end is driven by the power using device to rotate freely, the input and output ends being equivalent to a disengaged state of the clutch. The braking state of the brake is equivalent to the engaged state of the clutch, and the non-braking state of the brake is equivalent to the disengaged state of the clutch.

The connection in the present invention is divided into direct connection and indirect connection. The direct connection makes the revolving speed of each component in the connection the same, and the indirect connection makes a fixed proportional relationship of revolving speeds among the components in the connection. The connection described in the present invention means direct or indirect connection. The power source is an engine such as a fuel engine, an electric engine, a transmission device behind the engine, or the like; the power source is connected to the input end to input the power speed. The power using device is a device connected to the output end to receive power output, such as a rotor, a propeller or the like, or a drive shaft or a transmission device in front of the rotor, the propeller, or the like.

The advantages of the changeable linear speed reduction clutch of the present invention are that the changeable linear speed reduction clutch in the present invention is formed by connecting a changeable linear speed double-layer planetary gear train and a brake, and that the method for setting the changeable linear speed double-layer planetary gear train as well as the application method of the present invention are provided herein. Compared with the traditional transmission system of the helicopter in which the multi-stage speed reducer and the clutch are independently arranged, the changeable linear speed reduction clutch in the present invention has the functions of both a speed reducer and a clutch, which is small and light and has a simple structure, so that the transmission system of the helicopter is improved.

According to the practice in the industry, the planetary gear train in each figure is shown in a half schematic diagram. For each component, only the structural relationship is illustrated, but the actual dimensions are not shown.

DESCRIPTION OF EMBODIMENTS

Embodiment 1: a changeable linear speed reduction clutch which adopts a double-sun-gear planetary gear train is formed by connecting a changeable linear speed double-layer planetary gear train and a brake. The clutch functions as both a speed reducer and a clutch in a transmission system of a tail rotor propeller of a helicopter, and the tail rotor propeller is a new type of tail rotor of a high-speed helicopter which is being developed.

Figure 1:
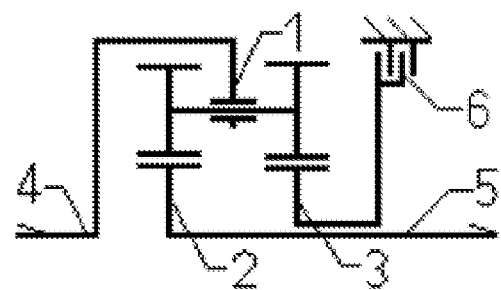
FIG. 1 is a schematic diagram of a changeable linear speed reduction clutch which adopts a double-sun-gear planetary gear train. 1 is a planetary carrier, 2 is a left central gear, 3 is a right central gear, 4 is an input end, 5 is an output end, and 6 is a brake.

The changeable linear speed double-layer planetary gear train adopts a double-sun-gear planetary gear train, and there are two planetary gear sets in the planetary gear train. The planetary carrier (1) of the planetary gear train is used as an input end (4), the left central gear (2) as an output end (5), and the right central gear (3) as a braking end, and the braking end is directly connected to the brake (6), as shown in FIG. 1.

The brake is a booster brake which at least has two states, that is, braking and non-braking states, and can be controlled by a control system to be in one of the two states.

The input end is connected to a power source engine, the output end is connected to a drive shaft in front of a power using device, being the tail rotor propeller of the helicopter, and the brake is controlled by the control system.

The changeable linear speed double-layer planetary gear train is set as follows: a characteristic parameter a is set to be close to but not equal to 1.0, so that a is from 0.8 to 1.25 and not equal to 1.0. Specifically, the value a depends on the speed deduction transmission ratio required. In the present embodiment, the speed deduction transmission ratio required is 40. Therefore, set a=39/40=number of teeth of a right central gear*number of teeth of a left planetary gear/(number of teeth of a left central gear*number of teeth of a right planetary gear)=18*26/(20*24). Specifically, set the number of teeth of a right central gear to be 18, the number of teeth of a left central gear to be 20, and the number of teeth of a right planetary gear to be 24 and the number of teeth of a left planetary gear to be 26. The gear module of the left central gear is not equal to the gear module of the right central gear. The speed reduction transmission ratio=1/(1−a)=40; the rotation directions of the input and output ends are the same.

Application method of the present embodiment: when the brake is controlled in the braking state, the power speed is input from the input end and transmitted in a deceleration manner to the output end for outputting at a speed reduction transmission ratio of 40, the input end being a driving end, and the output end being a driven end; the input and output ends are equivalent to an engaged state of the clutch. When the brake is controlled in the non-braking state, the braking end is free, the power speed is input from the input end, and the driven revolving speed of the power using device is input in reverse from the output end, the input and output ends being the driving ends and the braking end being the driven end; the power speed cannot be transmitted in a deceleration manner to the output end for outputting and the output end is driven by the power using device to rotate freely, the input and output ends being equivalent to a disengaged state of the clutch. The braking state of the brake is equivalent to the engaged state of the clutch, and the non-braking state of the brake is equivalent to the disengaged state of the clutch.

This embodiment is used in the transmission system of a tail rotor propeller of a helicopter, and realizes the functions of both a speed reducer and a clutch. The tail rotor propeller can choose to transmit power or interrupt power to rotate freely. Compared with the existing transmission system of the tail rotor propeller of the helicopter in which the multi-stage speed reducer and the clutch are independently arranged, the device in the present invention is small and light and has a simple structure, so that the transmission system is improved.

Embodiment 2: a changeable linear speed reduction clutch which adopts a double-inner-gear-ring planetary gear train is formed by connecting a changeable linear speed double-layer planetary gear train and a brake. The changeable linear speed reduction clutch functions as both a speed reducer and a clutch in a transmission system of a top rotor of a helicopter.

Figure 2:
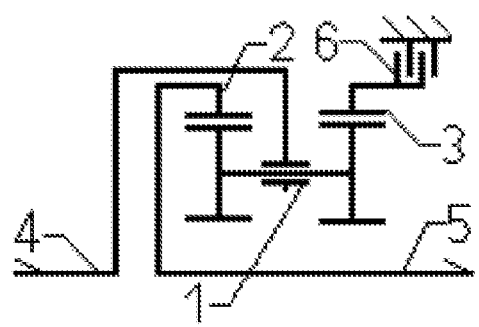
FIG. 2 is a schematic diagram of a changeable linear speed reduction clutch which adopts a double-inner-gear-ring planetary gear train. 1 is a planetary carrier, 2 is a left central gear, 3 is a right central gear, 4 is an input end, 5 is an output end, and 6 is a brake.

The changeable linear speed double-layer planetary gear train adopts a double-inner-gear-ring planetary gear train, and there are two planetary gear sets in the planetary gear train. The planetary carrier (1) of the planetary gear train is used as an input end (4), the left central gear (2) as an output end (5), and the right central gear (3) as a braking end, and the braking end is directly connected to the brake (6), as shown in FIG. 2.

The brake is a booster brake which at least has two states, that is, braking and non-braking states, and can be controlled by a control system to be in one of the two states.

The input end is connected to a power source engine, the output end is connected to a drive shaft in front of the power using device, being the top rotor of the helicopter. The brake is controlled by the control system.

The changeable linear speed double-layer planetary gear train is set as follows: a characteristic parameter a is set to be close to but not equal to 1.0, so that a is from 0.8 to 1.25 and not equal to 1.0. Specifically, the value a depends on the speed deduction transmission ratio required. In the present embodiment, the speed deduction transmission ratio required is 100. Therefore, set a=99/100=number of teeth of a right central gear*number of teeth of a left planetary gear/(number of teeth of a left central gear*number of teeth of a right planetary gear)=54*22/(60*20). Actually, set the number of teeth of a right central gear (inner gear ring) to be 54, the number of teeth of a left central gear (inner gear ring) to be 60, and the number of teeth of a right planetary gear to be 22 and the number of teeth of a left planetary gear to be 20. The gear module of the left central gear is not equal to the gear module of the right central gear. The speed reduction transmission ratio=1/(1−a)=100; the rotation directions of the input and output ends are the same.

Application method of the present embodiment: when the brake is controlled in the braking state, the power speed is input from the input end and transmitted in a deceleration manner to the output end for outputting at a speed reduction transmission ratio of 100, the input end being a driving end, and the output end being a driven end; the input and output ends are equivalent to an engaged state of the clutch. When the brake is controlled in the non-braking state, the braking end is free, the power speed is input from the input end, and the driven revolving speed of the power using device is input in reverse from the output end, the input and output ends being the driving ends and the braking end being the driven end; the power speed cannot be transmitted in a deceleration manner to the output end for outputting and the output end is driven by the power using device to rotate freely, the input and output ends being equivalent to a disengaged state of the clutch. The braking state of the brake is equivalent to the engaged state of the clutch, and the non-braking state of the brake is equivalent to the disengaged state of the clutch.

This embodiment is used in the transmission system of a top rotor of a helicopter, and realizes the functions of both a speed reducer and a clutch. The top rotor can choose to transmit power or interrupt power to rotate freely. Compared with the traditional transmission system in which the multi-stage speed reducer and the clutch are independently arranged, the device in the present invention is small and light and has a simple structure, so that the transmission system is improved.

The basic principles, main features and advantages of the present invention are shown and described above. Those skilled in the art should understand that the present invention is not limited by the aforementioned embodiments, and there are various changes and improvements to the present invention without departing from the spirit and scope of the present invention, and these changes and improvements fall within the scope of the present invention which claims protection. The scope of protection claimed by the present invention is defined by the appended claims and the equivalents.

What is claimed is:

1. A changeable linear speed reduction clutch, which is formed by connecting a changeable linear speed double-layer planetary gear train and a brake and is transmission machinery with functions of both a speed reducer and a clutch, wherein the changeable linear speed double-layer planetary gear train is characterized in that:

pitch circle diameters of two central gears are very close but not equal;

a planetary carrier of the changeable linear speed double-layer planetary gear train is used as an input end;

one central gear as an output end and the other central gear as a braking end;

the input end is also an input end and the output end is also an output end;

the braking end is directly connected to the brake;

the changeable linear speed double-layer planetary gear train adopts one of two types of planetary gear trains;

the brake is a booster brake, an electrically controlled brake or the similar, which at least has a braking state and a non-braking state and can be controlled in one of the two states by a control system;

the input end of the changeable linear speed reduction clutch is connected to a power source, the output end is connected to a power using device, and the brake is controlled by the control system;

the changeable linear speed double-layer planetary gear train is set as follows:

a characteristic parameter a of the planetary gear train is set to be 0.8 to 1.25 and not equal to 1.0, i.e., a=number of teeth of a right central gear * number of teeth of a left planetary gear/(number of teeth of a left central gear * number of teeth of a right planetary gear), so that a is from 0.8 to 1.25 and not equal to 1.0, wherein each combination of the number of teeth of the right central gear, the number of teeth of the left central gear, the number of teeth of the right planetary gear and the number of teeth of the left planetary gear corresponds to a value a, and the closer the value a is to 1.0, the greater a speed reduction transmission ratio will be, the speed reduction transmission ratio is 1/(1−a);

when the brake is controlled in the braking state, a power speed is input from the input end and transmitted in a deceleration manner to the output end for outputting according to the aforementioned speed reduction transmission ratio, the input end being a driving end and the output end being a driven end so that the input and output ends are equivalent to an engaged state of the clutch;

when the brake is controlled in the non-braking state, the braking end is free, the power speed is input from the input end, and the driven revolving speed of the power using device is input in reverse from the output end, the input and output ends being the driving ends and the braking end being the driven end, so that the power speed cannot be transmitted in a deceleration manner to the output end for outputting, and the output end is driven by the power using device to rotate freely, the input and output ends being equivalent to a disengaged state of the clutch, the braking of the brake being equivalent to the engaged state of the clutch, and the non-braking of the brake being equivalent to the disengaged state of the clutch.

2. The changeable linear speed reduction clutch according to claim 1, wherein the changeable linear speed double-layer planetary gear train adopts a double-sun-gear planetary gear train, the planetary carrier of the planetary gear train is used as the input end, the left central gear as the output end, and the right central gear as the braking end, and the braking end is directly connected to the brake.

3. The changeable linear speed reduction clutch according to claim 1, wherein the changeable linear speed double-layer planetary gear train adopts a double-inner-gear-ring planetary gear train, the planetary carrier of the planetary gear train is used as the input end, the left central gear as the output end, and the right central gear as the braking end, and the braking end is directly connected to the brake.

4. The changeable linear speed reduction clutch according to claim 2, wherein the changeable linear speed reduction clutch works as a speed reducer and a clutch in a transmission system of a tail rotor propeller of a helicopter.

5. The changeable linear speed reduction clutch according to claim 3, wherein the changeable linear speed reduction clutch works as a speed reducer and a clutch in a transmission system of a top rotor of a helicopter.

* * * * *